United States Patent
Nakamura et al.

(10) Patent No.: US 11,982,919 B2
(45) Date of Patent: May 14, 2024

(54) MACH-ZEHNDER TYPE OPTICAL MODULATOR

(71) Applicant: Mitsubishi Electric Corporation, Tokyo (JP)

(72) Inventors: Marika Nakamura, Tokyo (JP); Shusaku Hayashi, Tokyo (JP); Koichi Akiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 433 days.

(21) Appl. No.: 17/279,599

(22) PCT Filed: Dec. 6, 2018

(86) PCT No.: PCT/JP2018/044855
§ 371 (c)(1),
(2) Date: Mar. 25, 2021

(87) PCT Pub. No.: WO2020/115852
PCT Pub. Date: Jun. 11, 2020

(65) Prior Publication Data
US 2021/0341813 A1     Nov. 4, 2021

(51) Int. Cl.
*G02F 1/21*     (2006.01)
*G02F 1/225*     (2006.01)

(52) U.S. Cl.
CPC ............ *G02F 1/212* (2021.01); *G02F 1/2255* (2013.01); *G02F 1/2257* (2013.01)

(58) Field of Classification Search
CPC ....... G02F 1/212; G02F 1/2255; G02F 1/2257
See application file for complete search history.

(56) References Cited

U.S. PATENT DOCUMENTS

| | | | |
|---|---|---|---|
| 6,872,966 B2* | 3/2005 | Akiyama | ............ H01S 5/0265 257/14 |
| 7,130,493 B2* | 10/2006 | Heaton | ................ G02F 1/2257 385/40 |

(Continued)

FOREIGN PATENT DOCUMENTS

| CN | 108780236 A | 11/2018 |
|---|---|---|
| JP | 2003-177365 A | 6/2003 |

(Continued)

OTHER PUBLICATIONS

Japanese Office Action dated Jun. 21, 2022, in Japanese Application No. 2020-558740.

(Continued)

*Primary Examiner* — Daniel Petkovsek
(74) *Attorney, Agent, or Firm* — XSENSUS LLP

(57) ABSTRACT

It is an object of the present invention to provide a technique for making it possible to reduce the size of a Mach-Zehnder type optical modulator. In a clad layer, provided are a plurality of first and second via holes along an optical waveguide. The Mach-Zehnder type optical modulator includes a first travelling wave electrode connected to a first semiconductor region through the plurality of first via holes, extending along the optical waveguide in a plan view to have a width which is wider and a length and a second travelling wave electrode connected to a second semiconductor region through the plurality of second via holes, extending along the optical waveguide in a plan view to have a width which is wider and a length.

13 Claims, 16 Drawing Sheets

(56) References Cited

U.S. PATENT DOCUMENTS

| | | | |
|---|---|---|---|
| 9,207,469 B2* | 12/2015 | Yang | G02F 1/025 |
| 9,429,774 B2* | 8/2016 | Lee | G02F 1/011 |
| 9,448,425 B2* | 9/2016 | Ogawa | G02B 6/1228 |
| 9,829,726 B2* | 11/2017 | Kamei | G02F 1/025 |
| 2004/0207896 A1 | 10/2004 | Aoki et al. | |
| 2006/0023288 A1 | 2/2006 | McBrien et al. | |
| 2011/0243492 A1 | 10/2011 | Na et al. | |
| 2013/0209023 A1 | 8/2013 | Prosyk | |
| 2017/0336696 A1* | 11/2017 | Tsuzuki | G02F 1/2257 |
| 2019/0025615 A1 | 1/2019 | Kawamura et al. | |
| 2020/0292908 A1* | 9/2020 | Tsuzuki | G02F 1/2257 |

FOREIGN PATENT DOCUMENTS

| | | |
|---|---|---|
| JP | 2004-151590 A | 5/2004 |
| JP | 2006-39569 A | 2/2006 |
| JP | 2012-063769 A | 3/2012 |
| JP | 5413865 B1 | 2/2014 |
| JP | 2015-69199 A | 4/2015 |
| WO | 2017/159782 A1 | 9/2017 |

OTHER PUBLICATIONS

International Search Report and Written Opinion dated Feb. 26, 2019, received for PCT Application PCT/JP2018/044855 Filed on Dec. 6, 2018, 11 pages including English Translation.

Patel et al., "Design, Analysis, and Transmission System Performance of a 41 Ghz Silicon Photonic Modulator", Optics Express, vol. 23, No. 11, Jun. 1, 2015, pp. 14263-14287.

Office Action issued Nov. 1, 2023 in Chinese Patent Application No. 201880099618.4, 18 pages.

Japanese Office Action issued Nov. 1, 2022 in corresponding Japanese Patent Application No. 2020-558740 (with English machine-generated translation), 10 pages.

Office Action issued Feb. 8, 2024 in Chinese Patent Application No. 201880099618.4 with English Translation thereof.

* cited by examiner

F I G. 1 2
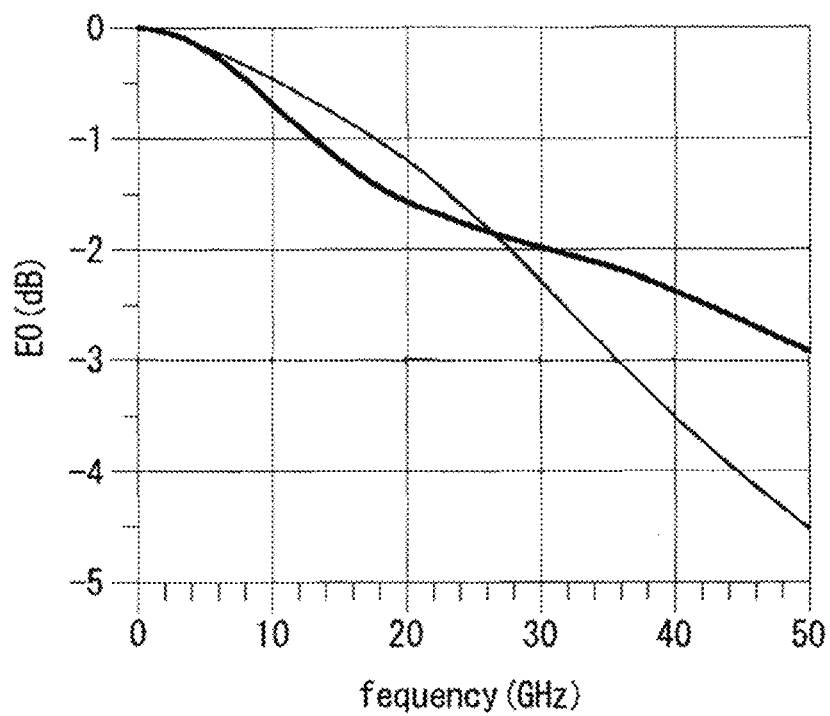

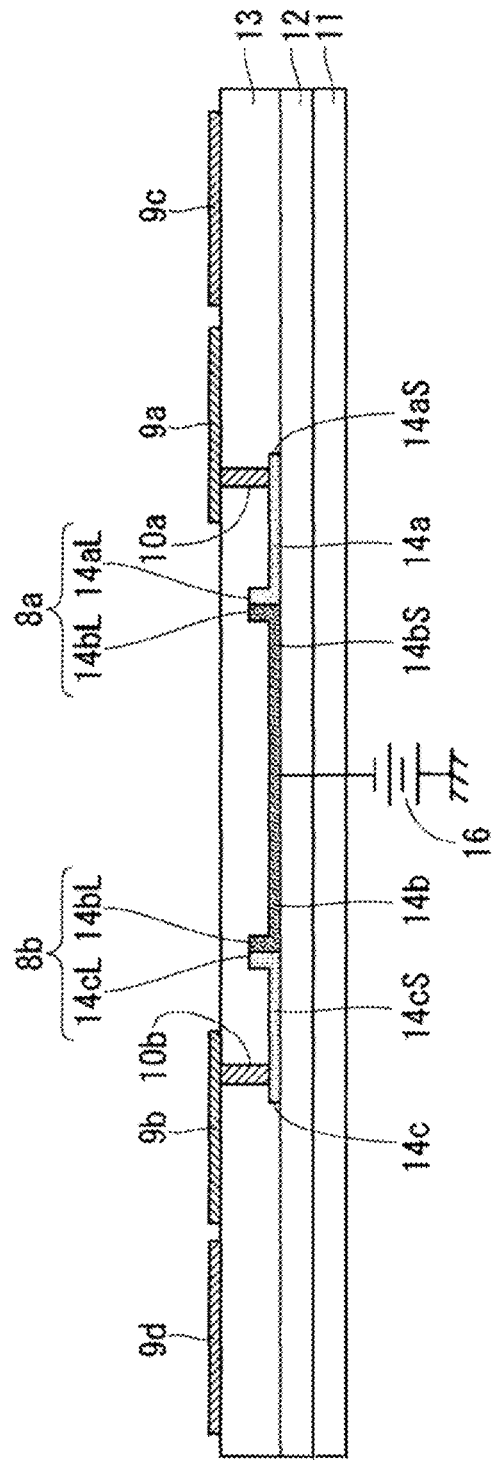

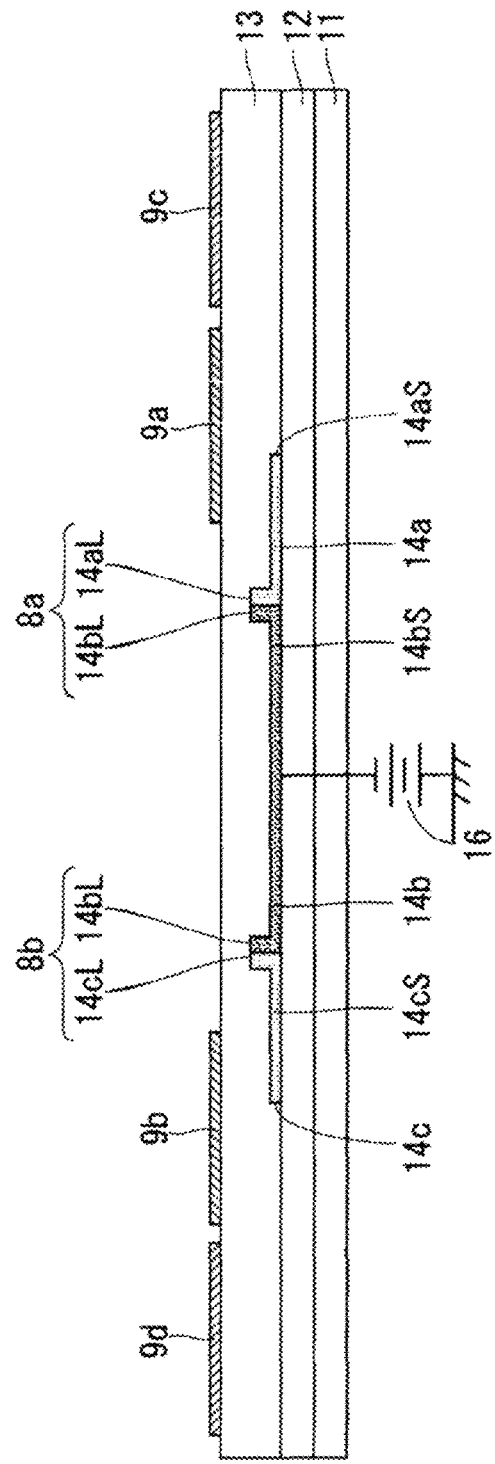

MACH-ZEHNDER TYPE OPTICAL MODULATOR

CROSS-REFERENCE TO RELATED APPLICATION

The present application is based on PCT filing PCT/JP2018/044855, filed Dec. 6, 2018, the entire contents of which are incorporated herein by reference.

TECHNICAL FIELD

The present invention relates to a Mach-Zehnder type optical modulator.

BACKGROUND ART

Cloud services are operated on the premise of an increase of information terminals and high-capacity communication with prevalence of smartphones. In recent years, with a growing use of the cloud services, capacity enlargement of an optical communication system for modulating optical signals by using electrical signals is proceeded. In order to respond to this capacity enlargement, required is an increase in the bit rate of modulation signals in an optical transceiver. For increasing the bit rate, there are methods of increasing the signal multiplicity and of increasing the modulation rate.

For a Mach-Zehnder type optical modulator (MZM) with very low wavelength chirping, which is the mainstream of optical modulators for long-distance key system, as a method of increasing the signal multiplicity, widely used are an intensity modulation system such as PAM4 (Pulse Amplitude Modulation 4) or the like and a phase modulation system such as QPSK (Quadrature Phase Shift Keying), 16QAM (16 Quadrature Amplifier Modulation), or the like. Since noise immunity decreases as the signal multiplicity increases, however, the signal transmission distance becomes shorter. For this reason, it is necessary to increase the bit rate by increasing the modulation rate. In order to increase the modulation rate while suppressing the power consumption and degradation in signal quality, required are impedance matching and matching between a high-frequency refractive index and an optical refractive index (hereinafter, sometimes referred to as "refractive index matching").

Formulas of the impedance and the high-frequency refractive index can be each expressed by using the capacitance and the inductance of a modulator (optical modulator). For this reason, in order to perform the impedance matching and the refractive index matching, it is necessary to optimize the capacitance and the inductance of the modulator. The capacitance of the modulator is expressed by the sum of the capacitance of a transmission line and the capacitance of an optical waveguide. Similarly, the inductance of the modulator is expressed by the sum of the inductance of the transmission line and the inductance of the optical waveguide. Since the inductance of the optical waveguide is lower than that of the transmission line, however, the inductance of the transmission line is predominant in the inductance of the modulator. In the Mach-Zehnder type optical modulator, by adjusting the electrode distance and the electrode width of a travelling wave electrode which guides a high-frequency signal and modulates light in a waveguide, it is possible to adjust the inductance and the capacitance of the transmission line. Since the capacitance of the optical waveguide is relatively large, however, it is hard to perform the impedance matching and the refractive index matching, and therefore it is necessary to adjust the capacitance of the optical waveguide.

For the optical modulator, a configuration using an electro optic effect by a dielectric material such as $LiNbO_3$ or the like and a configuration using an electroabsorption effect of semiconductor are mainly used. An electro-absorption optical modulator of semiconductor has an advantage of capable of performing a small-size, high-speed, and low driving voltage operation and integrating a drive driver IC (Integrated Circuit). An electro-absorption modulator using group III-V semiconductor such as InP-based, GaAs-based, or the like as a material has a characteristic feature of capable of being integrated with a semiconductor laser light source, and therefore development thereof is proceeded in advance. Further, apart from this, in an electro-absorption modulator using group IV semiconductor mainly formed of Si, since the processing technique and the mass production technique which are cultivated in the electronics field can be used, it is possible to achieve low-cost and fine device fabrication.

A Mach-Zehnder type optical modulator of group III-V semiconductor includes, for example, an optical waveguide in which a clad layer, a core layer, and a clad layer all of group III-V semiconductor are layered on a semiconductor substrate and a travelling wave electrode. The travelling wave electrode and the optical waveguide are connected to each other by electrodes formed immediately on the optical waveguide. In particular, since a Mach-Zehnder type optical modulator of group III-V semiconductor disclosed in Patent Document 1 has a periodic insulating structure in which a portion in which electrodes are disposed on the optical waveguide and another portion in which no electrode is disposed are alternately repeated by having a plurality of T-shaped electrodes which are periodically disposed in a plan view. In such a configuration, since the capacitance or the like of the optical waveguide can be reduced by adjusting the cycle, it is possible to perform the impedance matching and the refractive index matching.

On the other hand, a Mach-Zehnder type optical modulator of group IV semiconductor includes, for example, an optical waveguide in which a clad layer of insulator, a core layer of group IV semiconductor, and a clad layer of insulator are layered on a semiconductor substrate and a travelling wave electrode above the clad layer. The travelling wave electrode and the optical waveguide are connected to each other through a via hole penetrating the clad layer of insulator. In particular, since a Mach-Zehnder type optical modulator of group IV semiconductor disclosed in Patent Document 2 has a periodic insulating structure in which a portion in which the travelling wave electrode is connected to electrodes immediately on the optical waveguide and another portion in which the travelling wave electrode is away from the electrodes are alternately repeated. In such a configuration, since the capacitance or the like of the optical waveguide can be reduced by adjusting the cycle, it is possible to perform the impedance matching and the refractive index matching. Further, in a Mach-Zehnder type optical modulator of group IV semiconductor disclosed in Non-Patent Document 1, T-shaped electrodes are formed on the inner side of the travelling wave electrode and connected to the optical waveguide with only portions below the T-shaped electrodes used as the via holes, to thereby form a periodic insulating structure, as it is proceeded in the Mach-Zehnder type optical modulator of group III-V semiconductor, and the capacitance of the waveguide can be reduced.

PRIOR ART DOCUMENTS

Patent Documents

[Patent Document 1] Japanese Patent Application Laid Open Gazette No. 2004-151590
[Patent Document 2] Japanese Patent Application Laid Open Gazette No. 2015-69199

Non-Patent Documents

[Non-Patent Document 1] David Patel, et al., "Design, analysis, and transmission system performance of a 41 GHz silicon photonic modulator", OPTICS EXPRESS, 2015. Vol. 23, No. 11, PP. 14263 to 14287

SUMMARY

Problem to be Solved by the Invention

In the Mach-Zehnder type optical modulators of semiconductor disclosed in Patent Document 1 and Non-Patent Document 1, however, since the travelling wave electrode has the T-shaped electrodes, there is a problem that the size of the optical modulator disadvantageously becomes larger. Further, in the Mach-Zehnder type optical modulator of semiconductor disclosed in Patent Document 2, the shape of the travelling wave electrode is complicated and there is a problem that the size of the optical modulator disadvantageously becomes larger.

Then, the present invention is intended to solve the above problem, and it is an object of the present invention to provide a technique for making it possible to reduce the size of the Mach-Zehnder type optical modulator.

Means to Solve the Problem

The present invention is intended for a Mach-Zehnder type optical modulator. According to the present invention, the Mach-Zehnder type optical modulator includes a first semiconductor region, a second semiconductor region provided adjacent to the first semiconductor region, and a clad layer which covers an optical waveguide corresponding to an adjacent portion between the first semiconductor region and the second semiconductor region by covering the first semiconductor region and the second semiconductor region and has a refractive index lower than that of the optical waveguide, and in the Mach-Zehnder type optical modulator, a plurality of first via holes are provided along the optical waveguide in the clad layer on the first semiconductor region except the optical waveguide, and a plurality of second via holes are provided along the optical waveguide in the clad layer on the second semiconductor region except the optical waveguide, and the Mach-Zehnder type optical modulator further includes a first travelling wave electrode provided on the plurality of first via holes in a cross section and connected to the first semiconductor region through the plurality of first via holes, extending along the optical waveguide in a plan view to have a width wider than that of each of the plurality of first via holes and a length and a second travelling wave electrode provided on the plurality of second via holes in a cross section and connected to the second semiconductor region through the plurality of second via holes, extending along the optical waveguide in a plan view to have a width wider than that of each of the plurality of second via holes and a length.

Effects of the Invention

According to the present invention, the first and second travelling wave electrodes each having a width and a length along the optical waveguide in a plan view are connected to the first and second semiconductor regions through the plurality of first and second via holes, respectively. With such a configuration, it is possible to reduce the size of the Mach-Zehnder type optical modulator.

These and other objects, features, aspects and advantages of the present invention will become more apparent from the following detailed description of the present invention when taken in conjunction with the accompanying drawings.

BRIEF DESCRIPTION OF DRAWINGS

FIG. 12 is a graph for comparison between the Mach-Zehnder type optical modulator in accordance with the second preferred embodiment and the Mach-Zehnder type optical modulator of Non-Patent Document 1;

FIG. 15 is a cross section showing the configuration of the Mach-Zehnder type optical modulator in accordance with the third preferred embodiment; and FIG. 16 is a cross section showing the configuration of the Mach-Zehnder type optical modulator in accordance with the third preferred embodiment.

DESCRIPTION OF EMBODIMENT(S)

The First Preferred Embodiment

Figure 1:
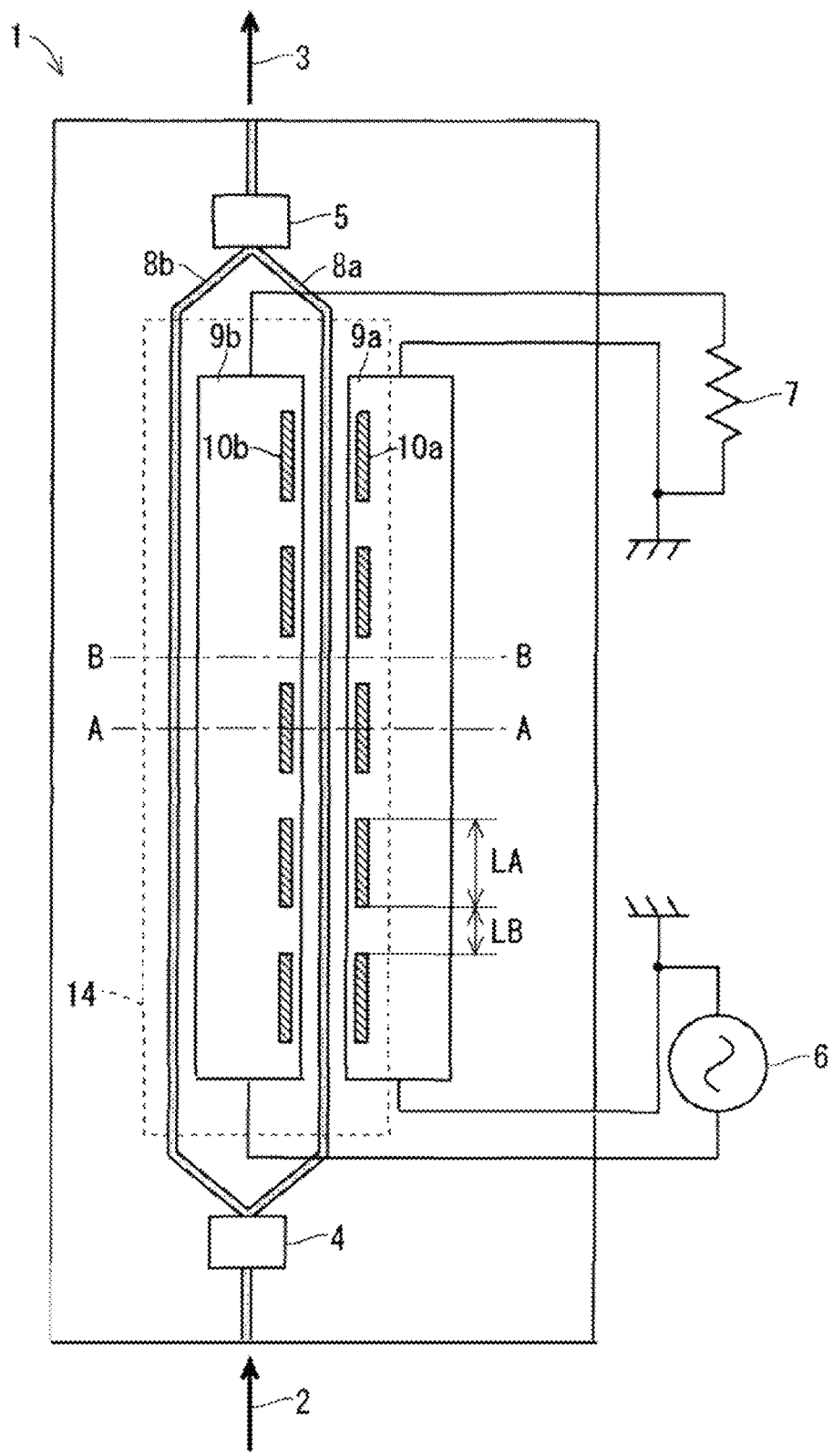
FIG. 1 is a plan view showing a configuration of a Mach-Zehnder type optical modulator in accordance with a first preferred embodiment.

FIG. 1 is a plan view showing a configuration of a Mach-Zehnder type optical modulator 1 (hereinafter, sometimes abbreviated to an "optical modulator 1") in accordance with the first preferred embodiment of the present invention. First, an overview of the configuration of the optical modulator 1 of the first preferred embodiment will be described.

The optical modulator 1 of the first preferred embodiment includes a demultiplexer (branching filter) 4, a multiplexer 5, a signal source 6, a terminating resistor 7, a first optical waveguide 8a which is an optical waveguide, a second optical waveguide 8b which is another optical waveguide, a first travelling wave electrode 9a, and a second travelling wave electrode 9b.

The demultiplexer 4 is connected to a light input portion which is one end of the first optical waveguide 8a and another light input portion which is one end of the second optical waveguide 8b. The demultiplexer 4 branches an input light 2 and outputs the branched light to the light input portion of the first optical waveguide 8a and the light input portion of the second optical waveguide 8b.

An electrical signal outputted from the signal source 6 is inputted to the first and second travelling wave electrodes 9a and 9b provided along a portion extending in one direction of the first optical waveguide 8a. The first travelling wave electrode 9a is a ground electrode and the second travelling wave electrode 9b is a signal electrode. When a high-frequency signal is applied to the first optical waveguide 8a through the first travelling wave electrode 9a, the refractive index of the first optical waveguide 8a is changed and the phase of an optical signal propagating in the first optical waveguide 8a is modulated.

The multiplexer 5 is connected to a light output portion which is the other end of the first optical waveguide 8a and another light output portion which is the other end of the second optical waveguide 8b. In the configuration to modulate the phase of the optical signal, the multiplexer 5 performs interference synthesis of a modulated wave which is phase-modulated and outputted from the light output portion of the first optical waveguide 8a and a reference wave outputted from the light output portion of the second optical waveguide 8b. Then, the multiplexer 5 outputs an optical signal whose phase is changed with the refractive index difference of light, as an output light 3. On the other hand, in the configuration to modulate the intensity of the optical signal, the multiplexer 5 synthesizes light outputted from the light output portion of the first optical waveguide 8a and light outputted from the light output portion of the second optical waveguide 8b, to thereby convert the modulation of the phase of the optical signal into the modulation of the intensity of the optical signal. Then, the multiplexer 5 outputs the optical signal whose intensity is modulated, as the output light 3. The Mach-Zehnder type optical modulator 1 of the first preferred embodiment having such a configuration can modulate at least one of the phase and the intensity of the light inputted to the Mach-Zehnder type optical modulator 1. Further, for the modulation of the phase of the light, for example, one pair×two Mach-Zehnder type optical modulators 1 are used, and for the modulation of the intensity of the light, for example, two pairs×two Mach-Zehnder type optical modulators 1 are used.

Furthermore, the electrical signals inputted to the first and second travelling wave electrodes 9a and 9b are terminated by the terminating resistor 7. In the first preferred embodiment, for performing single-phase drive, the resistance value of the terminating resistor 7 is preferably, for example, 50Ω but may take any other value.

Figure 2:
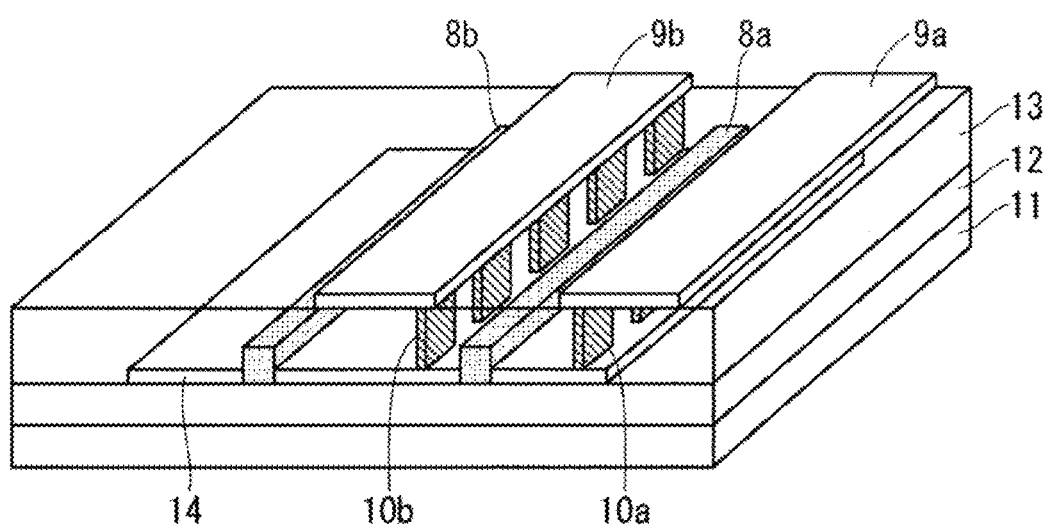
FIG. 2 is a perspective view showing the configuration of the Mach-Zehnder type optical modulator in accordance with the first preferred embodiment.
Figure 3:
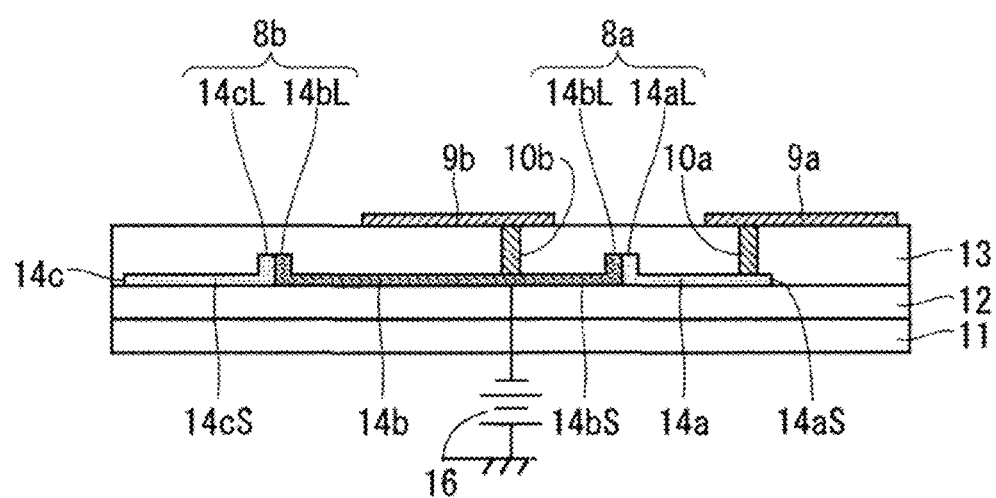
FIG. 3 is a cross section showing the configuration of the Mach-Zehnder type optical modulator in accordance with the first preferred embodiment.

Next, details of the configuration of the optical modulator 1 of the first preferred embodiment will be described. FIG. 2 is a perspective view showing the configuration of the optical modulator 1 in accordance with the first preferred embodiment. FIG. 3 is a cross section taken along the line A-A of FIG. 1, and FIG. 4 is a cross section taken along the line B-B of FIG. 1.

The optical modulator 1 of the first preferred embodiment includes a substrate 11, a lower clad layer 12, an upper clad layer 13, a core layer 14, and a DC power supply 16, besides the first and second travelling wave electrodes 9a and 9b and the like described above. As shown in FIGS. 3 and 4, the core layer 14 includes an n-type first semiconductor region 14a, a p-type second semiconductor region 14b, and an n-type third semiconductor region 14c. Further, n-type and p-type may be reversed. Specifically, the core layer 14 may include a p-type first semiconductor region 14a, an n-type second semiconductor region 14b, and a p-type third semiconductor region 14c. The second semiconductor region 14b is provided adjacent to the first semiconductor region 14a, and the third semiconductor region 14c is provided adjacent to the second semiconductor region 14b on the opposite side of the first semiconductor region 14a.

The lower clad layer 12 is provided on the substrate 11, the core layer 14 is selectively provided on the lower clad layer 12, and the upper clad layer 13 is provided on the lower clad layer 12 and the core layer 14.

Figure 4:
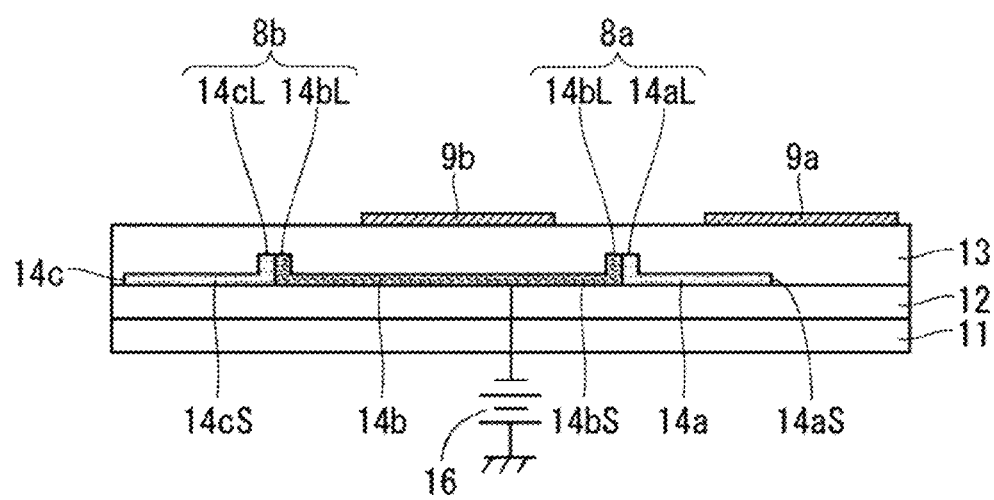
FIG. 4 is a cross section showing the configuration of the Mach-Zehnder type optical modulator in accordance with the first preferred embodiment.

As shown in FIGS. 3 and 4, the first semiconductor region 14a includes a slab 14aS and a rib 14aL having a thickness larger than that of the slab 14aS. Similarly, the second semiconductor region 14b includes a slab 14bS and two ribs 14bL, and the third semiconductor region 14c includes a slab 14cS and a rib 14cL.

An adjacent portion between the first semiconductor region 14a and the second semiconductor region 14b corresponds to the first optical waveguide 8a. Further, in a case where the adjacent portion is formed of the rib 14aL and the rib 14bL, the first optical waveguide 8a may be the adjacent portion itself, may be part of the adjacent portion, or may be a portion formed of the slab and a clad additionally to the adjacent portion. Similarly, an adjacent portion between the second semiconductor region 14b and the third semiconductor region 14c corresponds to the second optical waveguide 8b. Further, in a case where the adjacent portion is formed of another rib 14bL and the rib 14cL, the second optical waveguide 8b may be the adjacent portion itself, may be part of the adjacent portion, or may be a portion formed of the slab and a clad additionally to the adjacent portion. A clad layer including the lower clad layer 12 and the upper clad layer 13 described above covers the first to third semiconductor regions 14a to 14c of the core layer 14, to thereby cover the first and second optical waveguides 8a and 8b. Furthermore, the refractive index of the lower clad layer 12 and the upper clad layer 13 is lower than that of the first and second optical waveguides 8a and 8b.

Hereinafter, the first and second optical waveguides 8a and 8b will be sometimes abbreviated to an "optical waveguide" and described. Furthermore, hereinafter, the lower clad layer 12 and the upper clad layer 13 will be sometimes abbreviated to a "clad layer" and described.

In the first preferred embodiment, the rib 14aL and the rib 14bL are connected to each other, to thereby form a PN junction, and another rib 14bL and the rib 14cL are connected to each other, to thereby form a PN junction. For this reason, the first optical waveguide 8a which corresponds to the adjacent portion between the first semiconductor region 14a and the second semiconductor region 14b includes a p-type semiconductor and an n-type semiconductor, and the second optical waveguide 8b which corresponds to the adjacent portion between the second semiconductor region 14b and the third semiconductor region 14c includes a p-type semiconductor and an n-type semiconductor.

When a reverse bias is applied to the PN junction by using the DC power supply 16, a depletion layer is formed in the PN junction, and therefore carriers can move at a high speed and further the modulation rate of light can be increased.

Further, when a voltage is applied to the PN junction, change in carrier density is caused and carrier plasma dispersion is caused, and therefore the refractive index is changed. When the carrier density increases, the refractive index decreases, and when the carrier density decreases, the refractive index increases. When the high-frequency signal is applied to the first travelling wave electrode 9a, for example, the width of the depletion layer is reduced in the PN junction made of the rib 14aL and the rib 14bL, and therefore the carrier density of the first optical waveguide 8a decreases and the refractive index increases. With such a phenomenon, by controlling the carrier density of the PN junction, the refractive index of the first optical waveguide 8a is changed, and further the phase of the optical signal propagating in the first optical waveguide 8a is modulated. Furthermore, in the first preferred embodiment, since the PN junction of the rib 14aL and the rib 14bL and the PN junction of the rib 14bL and the rib 14cL are connected in series oppositely, the capacity of the PN junction can be reduced and further the band can be increased.

Thus, one exemplary configuration of the clad layer and the optical waveguide has been described. The configuration of the clad layer and the optical waveguide in accordance with the first preferred embodiment, however, is not limited to the above-described example. For example, a BOX (Buried Oxide) of a SOI (Silicon on Insulator) substrate may serve as the lower clad layer 12, or an oxide layer may be formed as the lower clad layer 12 on a Si substrate, instead of using the SOI substrate. Further, though the material of the substrate 11 and the core layer 14 is Si in the first preferred embodiment, the material has only to be a group IV semiconductor. Furthermore, though the material of the clad layer is $SiO_2$ in the first preferred embodiment, the material has only to be a material having a refractive index lower than that of the core layer 14. Further, though the cross section of FIG. 3 shows a configuration in which a junction surface of the PN junction is provided in a vertical direction with respect to the substrate, even a configuration in which the junction surface of the PN junction is provided in a horizontal direction with respect to the substrate can produce the same effect. Furthermore, the optical waveguide is not limited to a rib-type and PN junction-type optical waveguide described above, but may be, for example, a MOS (Metal Oxide Semiconductor) capacitor-type optical waveguide or a PIN (Positive-Intrinsic-Negative)-type optical waveguide.

As shown in FIGS. 2 and 3, a plurality of first via holes 10a which are a plurality of through holes connecting the first travelling wave electrode 9a and the first semiconductor region 14a are provided in the clad layer on the first semiconductor region 14a except the first optical waveguide 8a, along the first optical waveguide 8a. Similarly, a plurality of second via holes 10b which are a plurality of through holes connecting the second travelling wave electrode 9b and the second semiconductor region 14b are provided in the clad layer on the second semiconductor region 14b except the first optical waveguide 8a, along the first optical waveguide 8a.

In the first preferred embodiment, the plurality of first via holes 10a are provided periodically (at regular distance intervals) in the upper clad layer 13 on the first semiconductor region 14a except the rib, along the first optical waveguide 8a and further the first travelling wave electrode 9a. Similarly, the plurality of second via holes 10b are provided periodically (at regular distance intervals) in the upper clad layer 13 on the second semiconductor region 14b except the rib, along the first optical waveguide 8a and further the second travelling wave electrode 9b. With the arrangement of the plurality of first and second via holes 10a and 10b, it is possible to simplify the structural design and the fabrication process.

Further, in the first preferred embodiment, each of the plurality of first via holes 10a has a shape extending in an extension direction of the first travelling wave electrode 9a in a plan view. Similarly, each of the plurality of second via holes 10b has a shape extending in an extension direction of the second travelling wave electrode 9b in a plan view. With such a shape of each of the plurality of first and second via holes 10a and 10b, it is possible to simplify the structural design and the fabrication process.

The first travelling wave electrode 9a is provided immediately on the plurality of first via holes 10a in a cross section and connected to the first semiconductor region 14a through the plurality of first via holes 10a. Similarly, the second travelling wave electrode 9b is provided immediately on the plurality of second via holes 10b in a cross section and connected to the second semiconductor region 14b through the plurality of second via holes 10b. Specifically, the first travelling wave electrode 9a is electrically connected to the first semiconductor region 14a through a not-shown conductive member inside each of the plurality of first via holes 10a, and the second travelling wave electrode 9b is electrically connected to the second semiconductor region 14b through a not-shown conductive member inside each of the plurality of second via holes 10b. With the first and second travelling wave electrodes 9a and 9b, a voltage to modulate the optical signal propagating in the first optical waveguide 8a can be applied to the first optical waveguide 8a.

The first travelling wave electrode 9a extends along the first optical waveguide 8a to have a width and a length in a plan view and the width is larger than that of each of the plurality of first via holes 10a. Similarly, the second travelling wave electrode 9b extends along the first optical waveguide 8a to have a width and a length in a plan view and the width is larger than that of each of the plurality of second via holes 10b.

The first and second travelling wave electrodes 9a and 9b each have no T-shaped electrode shown in Patent Document 1 and Non-Patent Document 1. The shape of each of the first and second travelling wave electrodes 9a and 9b in a plan view includes, for example, a solid shape which is a rectangle with no blank therein or a substantial rectangle with no blank therein having rounded corners, or the like. Further, in the first preferred embodiment, the shapes of the first and second travelling wave electrodes 9a and 9b are line symmetric to each other with respect to the first optical waveguide 8a, and the width of the first travelling wave electrode 9a and that of the second travelling wave electrode 9b are equal to each other. With such line symmetric shapes of the first and second travelling wave electrodes 9a and 9b, it is possible to make the structural design easier.

Thus, one exemplary configuration of the first and second via holes 10a and 10b and the first and second travelling wave electrodes 9a and 9b has been described. The configuration of the first and second via holes 10a and 10b and the first and second travelling wave electrodes 9a and 9b, however, is not limited to the above example.

Though the plurality of first and second via holes 10a and 10b are provided periodically in the clad layer in the above description, for example, this arrangement is not essential. Further, though the shape of each of the plurality of first and second via holes 10a and 10b is a shape extending in the extension direction of the first and second travelling wave electrodes 9a and 9b in the above description, for example, this shape is not essential. Furthermore, though the shapes of the first and second travelling wave electrodes 9a and 9b are line symmetric to each other with respect to an extending portion of the first optical waveguide 8a in the above description, for example, these shapes are not essential.

Next, the structural design of the optical modulator 1 in accordance with the first preferred embodiment will be described. In order to achieve an increase in the communication capacity (channel capacity) and further achieve an increase in the bit rate, an increase in the modulation rate while suppressing the power consumption and degradation in signal quality is required. In order to achieve this, the impedance matching to reduce reflection of an electrical signal and the refractive index matching to cause the phase velocity of the electrical signal and that of the optical signal to coincide with each other and not to depend on the time constant are required.

Respective formulas of the impedance $Z_0$ and the high-frequency refractive index $n_\mu$ can be expressed by using the inductance and the capacitance of the optical modulator 1 (hereinafter, sometimes abbreviated to a "modulator"), as shown in the following Equations (1) and (2). For this reason, in order to perform the impedance matching and the refractive index matching, it is necessary to optimize the capacitance and the inductance of the modulator.

$$Z_0 = \sqrt{\frac{L_0}{C_0}} \tag{1}$$

$$n_\mu = c\sqrt{L_0 C_0} \tag{2}$$

Herein, $L_0$ represents the inductance of the modulator, $C_0$ represents the capacitance of the modulator, and c represents the speed of light. The optimization goal is, for example, to make the impedance $Z_0$ approximate to 50Ω and make the high-frequency refractive index ng approximate to a value of the optical refractive index $n_{opt}$, i.e., 3.7, and in other words, in Eqs. (1) and (2), to make the inductance $L_0$ approximate to 617 nH/m and make the capacitance $C_0$ approximate to 246 pH/m.

The inductance $L_0$ of the modulator and the capacitance $C_0$ of the modulator are expressed as the following Equations (3) to (5).

$$L_0 = L_{opt} + L_{TL} \cong L_{TL} \tag{3}$$

$$C_0 = C_{opt} + C_{TL} \tag{4}$$

$$C_{opt} = \varepsilon_0 \varepsilon_r \times \frac{s}{d} \times k \tag{5}$$

Herein, $L_{opt}$ represents the inductance of the optical waveguide, $L_{TL}$ represents the inductance of the transmission line, $C_{opt}$ represents the capacitance of the optical waveguide, $C_{TL}$ represents the capacitance of the transmission line, $\varepsilon_0$ represents the dielectric constant of vacuum, $\varepsilon_r$ represents the relative dielectric constant of a material, S represents the area of the PN junction, and d represents the thickness of the depletion layer. In the Mach-Zehnder type optical modulator, the first and second travelling wave electrodes 9a and 9b (hereinafter, sometimes abbreviated to "travelling wave electrodes") correspond to the transmission lines. Herein, the inductance $L_{TL}$ and the capacitance $C_{TL}$ of the transmission line can be adjusted with the electrode distance of the travelling wave electrodes, the electrode width of the travelling wave electrode, the dielectric constant, and the height of dielectric. The capacitance $C_{opt}$ of the optical waveguide can be adjusted with the via hole factor k on the arrangement of the first and second via holes 10a and 10b (hereinafter, sometimes abbreviated to "via holes").

In the first preferred embodiment, made is a structural design to perform matching of the impedance $Z_0$ and matching of the refractive index $n_\mu$ by using the cycle of the via holes and the ratio of the length of a region without via hole. Herein, the ratio of the length refers to the ratio of the length LA to the sum of the length LA and the length LB in FIG. 1, which is defined as a via hole fill factor.

Further, in an optical modulator other than the optical modulator 1 of the first preferred embodiment, for example, in an optical modulator in which the travelling wave electrode and the waveguide are connected to each other by intermittent contact using solder, an air bridge, or the like, the impedance matching and the refractive index matching can be performed by adjusting a ratio of a contact portion and a non-contact portion. The optical modulator 1 of the first preferred embodiment using the via holes, however, produces effects of achieving more precise design, as compared with these optical modulators, and of reducing the size of the optical modulator 1, as described below.

In the structural design of the optical modulator 1 in accordance with the first preferred embodiment, for example, the high-frequency 3D electromagnetic (EM) field solver, "HFSS", manufactured by ANSYS, Inc. is used to fabricate a temporary structure, calculate the S-parameters, and calculate parameters such as the inductance $L_0$ of the modulator, the capacitance $C_0$ of the modulator, the impedance $Z_0$ of the modulator, the high-frequency refractive index $n_\mu$, and the like. Next, the obtained parameters are compared with respective target values (the impedance $Z_0$ of the modulator is 50Ω, the high-frequency refractive index $n_\mu$ is 3.7, the inductance $L_0$ of the modulator is 617 nH/m, and the capacitance $C_0$ is 246 pH/m), and an operation for adjusting the S-Parameters and further the structure is repeated until desired characteristics can be obtained. In a case where the electrode distance of the travelling wave electrodes is increased or where the electrode width thereof is reduced, for example, the impedance $Z_0$ becomes higher, and in a case where the via hole fill factor is reduced, the capacitance $C_0$ becomes smaller.

Hereinafter, an exemplary calculation for obtaining the inductance $L_0$ of the modulator and the capacitance $C_0$ of the modulator from the S-parameters will be described. The following Equations (6) to (9) are used for the S-parameters (S11, S12, S21, S22) obtained by the calculation of the HFSS, to thereby calculate the F-parameters (A, B, C, D).

$$A = \frac{(1+S_{11})(1-S_{22}) + S_{12}S_{21}}{2S_{21}} \quad (6)$$

$$B = \frac{Z_r\{(1+S_{11})(1+S_{22}) - S_{12}S_{21}\}}{2S_{21}} \quad (7)$$

$$C = \frac{(1-S_{11})(1-S_{22}) - S_{12}S_{21}}{2S_{21}Z_r} \quad (8)$$

$$D = \frac{(1-S_{11})(1+S_{22}) + S_{12}S_{21}}{2S_{21}} \quad (9)$$

Herein, $Z_r$ represents the reference impedance, and in the first preferred embodiment, it is assumed that the reference impedance $Z_r$ is 50Ω which is equal to the resistance value of the terminating resistor 7. The following Equations (10) and (11) are used for the obtained F-parameters (A, B, C, D), to thereby calculate the impedance $Z_0$ and a complex microwave transmission constant γ. The following Equations (12) and (13) are used for the impedance $Z_0$ and the complex microwave transmission constant γ which are obtained above, to thereby calculate the inductance $L_0$ of the modulator and the capacitance $C_0$ of the modulator. Herein, ω represents an angular frequency.

$$Z_0 = \sqrt{\frac{B}{C}} \quad (10)$$

$$\gamma = \frac{In\left[\frac{A+D}{2} + \sqrt{BC}\right]}{l}i \quad (11)$$

$$L_0 = \frac{Im(\gamma \cdot Z_0)}{\omega} \quad (12)$$

$$C_0 = \frac{Im\left[\frac{\gamma}{Z_0}\right]}{\omega} \quad (13)$$

<Summary of the First Preferred Embodiment>

In the Mach-Zehnder type optical modulator 1 of the first preferred embodiment described above, the plurality of first and second via holes 10a and 10b are provided in the clad layer, and the first and second travelling wave electrodes 9a and 9b are connected to the first and second semiconductor regions 14a and 14b through the plurality of first and second via holes 10a and 10b. With such a configuration, by adjusting the plurality of first and second via holes 10a and 10b, it is possible to perform matching of the inductance and the capacitance of the modulator. Since this increases the frequency in −3 dB band of the electro-optical conversion gain and therefore the high modulation band can be obtained, it is possible to achieve high modulation efficiency and achieve a higher speed. Further, since the travelling wave electrode has no T-shaped electrode, it is possible to reduce the size of the Mach-Zehnder type optical modulator. Furthermore, since the inductance decreases, it becomes easier to perform matching. Moreover, since the cost of the Mach-Zehnder type optical modulator including the group IV semiconductor is generally lower than that of the Mach-Zehnder type optical modulator including the group III-V semiconductor and an insulator in which the via holes can be formed is found, simplification of the device fabrication process and cost reduction can be expected.

Further, in the first preferred embodiment, since the first optical waveguide 8a which corresponds to the adjacent portion includes the p-type semiconductor and the n-type semiconductor, it is possible to make the structural design easier.

Further, when the Mach-Zehnder type optical modulator of the first preferred embodiment is applied to a Mach-Zehnder type optical modulator of the phase modulation system, it is possible to perform multi-level modulation and increase the amount of information to be transmitted. Furthermore, when the Mach-Zehnder type optical modulator of the first preferred embodiment is applied to a Mach-Zehnder type optical modulator of the intensity modulation system, this is effective for long-distance use since the wavelength chirping can be reduced.

The Second Preferred Embodiment

Figure 5:
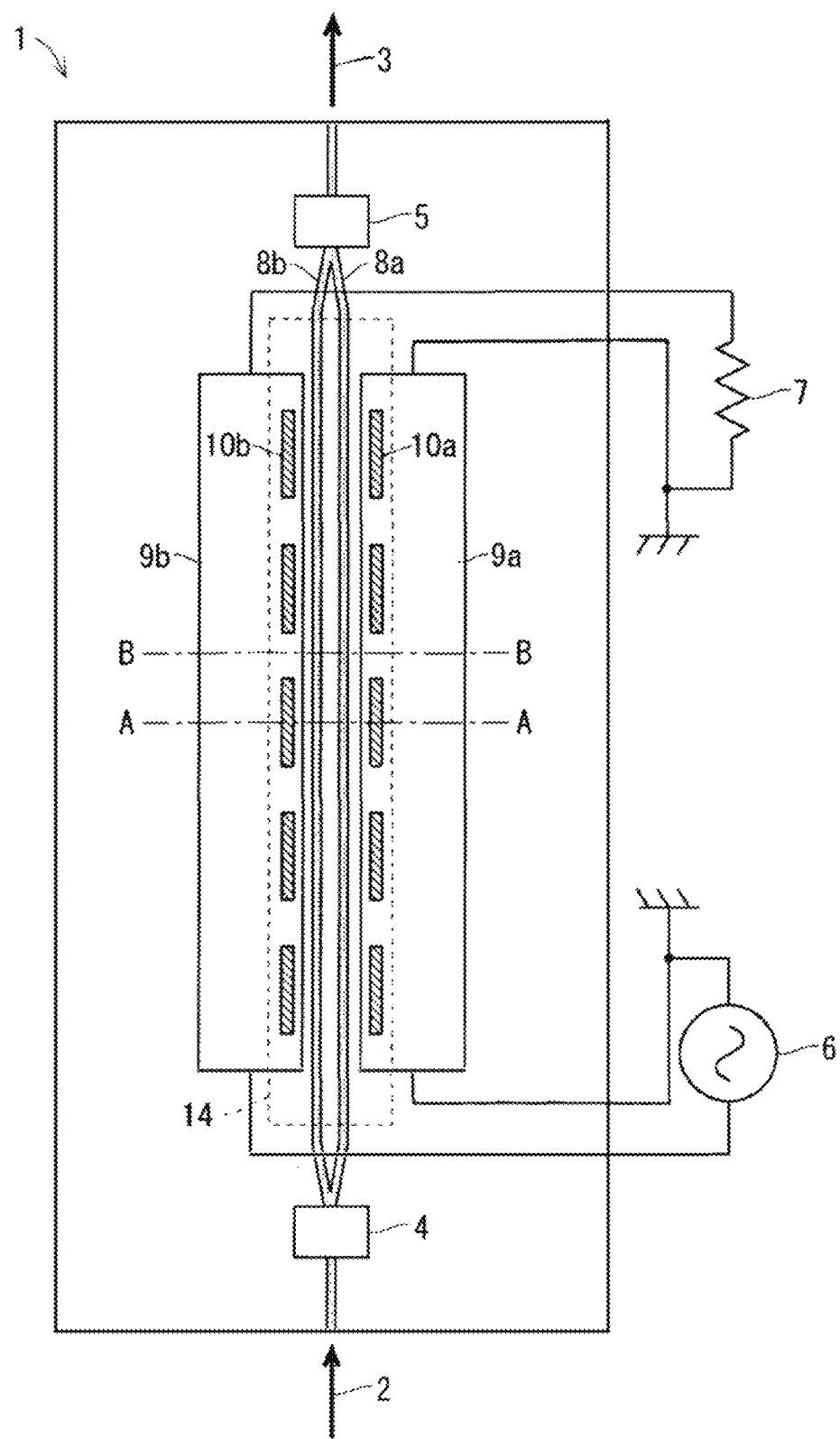
FIG. 5 is a plan view showing a configuration of a Mach-Zehnder type optical modulator in accordance with a second preferred embodiment.

FIG. 5 is a plan view showing a configuration of a Mach-Zehnder type optical modulator 1 (hereinafter, sometimes abbreviated to an "optical modulator 1") in accordance with the second preferred embodiment of the present invention. Hereinafter, the constituent elements of the second preferred embodiment which are identical to or similar to those described above will be represented by the same reference signs.

Like the optical modulator 1 of the first preferred embodiment, the optical modulator 1 of the second preferred embodiment includes a demultiplexer (branching filter) 4, a multiplexer 5, a signal source 6, a terminating resistor 7, a first optical waveguide 8a, a second optical waveguide 8b, a first travelling wave electrode 9a, and a second travelling wave electrode 9b.

The demultiplexer 4 is connected to a light input portion which is one end of the first optical waveguide 8a and another light input portion which is one end of the second optical waveguide 8b. The demultiplexer 4 branches an input light 2 and outputs the branched light to the light input portion of the first optical waveguide 8a and the light input portion of the second optical waveguide 8b.

In the second preferred embodiment, the first travelling wave electrode 9a is provided along a portion extending in one direction of the first optical waveguide 8a and the second travelling wave electrode 9b is provided along a portion extending in one direction of the second optical waveguide 8b. In other words, the first and second travelling wave electrodes 9a and 9b are provided to sandwich the first and second optical waveguides 8a and 8b in a plan view.

An electrical signal outputted from the signal source 6 is inputted to the first and second travelling wave electrodes 9a and 9b. The first travelling wave electrode 9a is a ground electrode and the second travelling wave electrode 9b is a signal electrode. When a high-frequency signal is applied to the first optical waveguide 8a through the first travelling wave electrode 9a, the refractive index of the first optical waveguide 8a is changed and the phase of an optical signal propagating in the first optical waveguide 8a is modulated.

The multiplexer 5 is connected to a light output portion which is the other end of the first optical waveguide 8a and another light output portion which is the other end of the second optical waveguide 8b. In the configuration to modulate the phase of the optical signal, the multiplexer 5 performs interference synthesis of a modulated wave which is phase-modulated and outputted from the light output portion of the first optical waveguide 8a and a reference wave outputted from the light output portion of the second optical waveguide 8b. Then, the multiplexer 5 outputs an optical signal whose phase is changed with the refractive index difference of light, as an output light 3. On the other hand, in the configuration to modulate the intensity of the optical signal, the multiplexer 5 synthesizes light outputted from the light output portion of the first optical waveguide 8a and light outputted from the light output portion of the second optical waveguide 8b, to thereby convert the modulation of the phase of the optical signal into the modulation of the intensity of the optical signal. Then, the multiplexer 5 outputs the optical signal whose intensity is modulated, as the output light 3. The Mach-Zehnder type optical modulator 1 of the second preferred embodiment having such a configuration can modulate at least one of the phase and the intensity of the light inputted to the Mach-Zehnder type optical modulator 1. Further, for the modulation of the phase of the light, for example, one pair×two Mach-Zehnder type optical modulators 1 are used, and for the modulation of the intensity of the light, for example, two pairs×two Mach-Zehnder type optical modulators 1 are used.

Furthermore, the electrical signals inputted to the first and second travelling wave electrodes 9a and 9b are terminated by the terminating resistor 7. In the second preferred embodiment, for performing single-phase drive, the resistance value of the terminating resistor 7 is preferably, for example, 50Ω but may take any other value.

Figure 6:
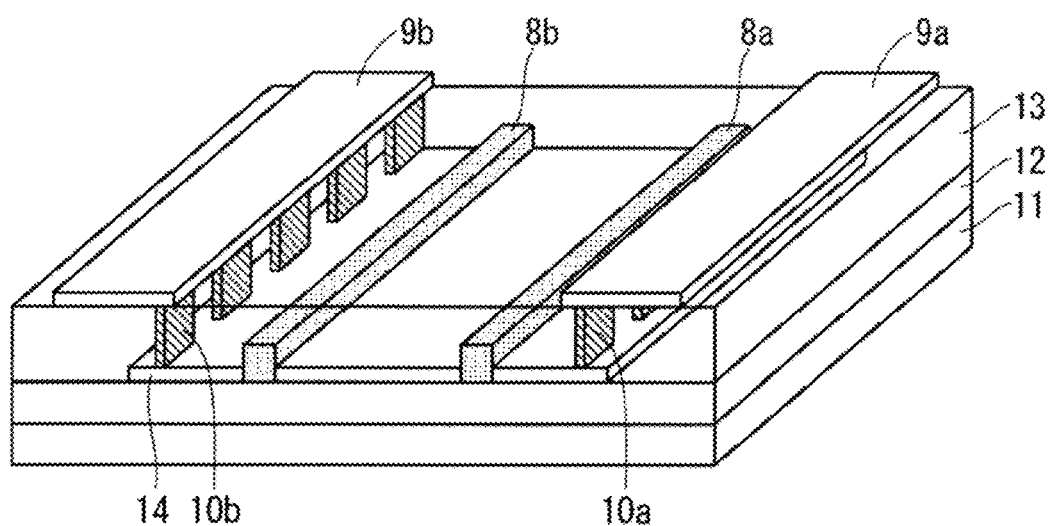
FIG. 6 is a perspective view showing the configuration of the Mach-Zehnder type optical modulator in accordance with the second preferred embodiment.
Figure 7:
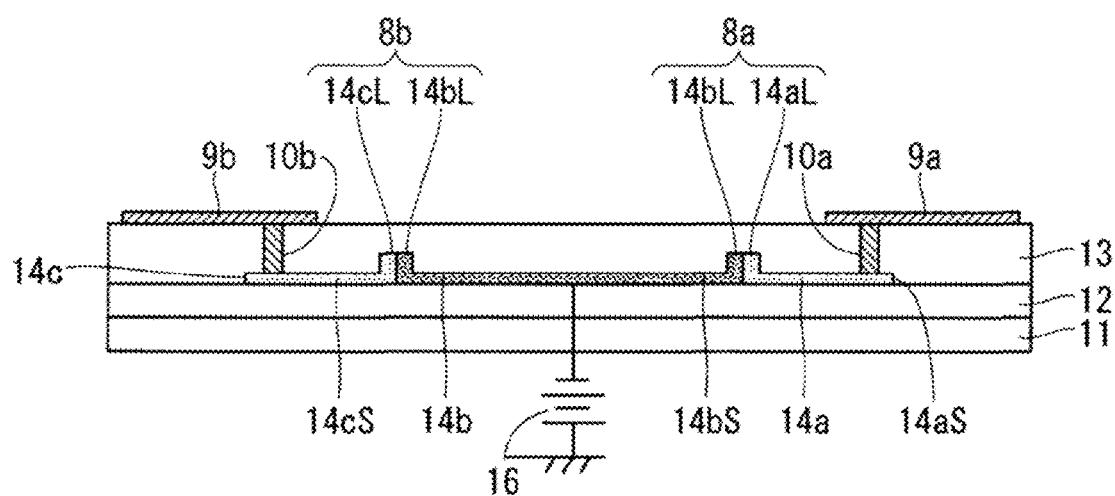
FIG. 7 is a cross section showing the configuration of the Mach-Zehnder type optical modulator in accordance with the second preferred embodiment.

Next, details of the configuration of the optical modulator 1 of the second preferred embodiment will be described. FIG. 6 is a perspective view showing the configuration of the optical modulator 1 in accordance with the second preferred embodiment. FIG. 7 is a cross section taken along the line A-A of FIG. 5, and FIG. 8 is a cross section taken along the line B-B of FIG. 5.

The optical modulator 1 of the second preferred embodiment includes a substrate 11, a lower clad layer 12, an upper clad layer 13, a core layer 14, and a DC power supply 16, besides the first and second travelling wave electrodes 9a and 9b and the like described above. As shown in FIGS. 7 and 8, the core layer 14 includes an n-type first semiconductor region 14a, a p-type second semiconductor region 14b, and an n-type third semiconductor region 14c. Further, n-type and p-type may be reversed. Specifically, the core layer 14 may include a p-type first semiconductor region 14a, an n-type second semiconductor region 14b, and a p-type third semiconductor region 14c. The second semiconductor region 14b is provided adjacent to the first semiconductor region 14a, and the third semiconductor region 14c is provided adjacent to the second semiconductor region 14b on the opposite side of the first semiconductor region 14a.

The lower clad layer 12 is provided on the substrate 11, the core layer 14 is selectively provided on the lower clad layer 12, and the upper clad layer 13 is provided on the lower clad layer 12 and the core layer 14.

Figure 8:
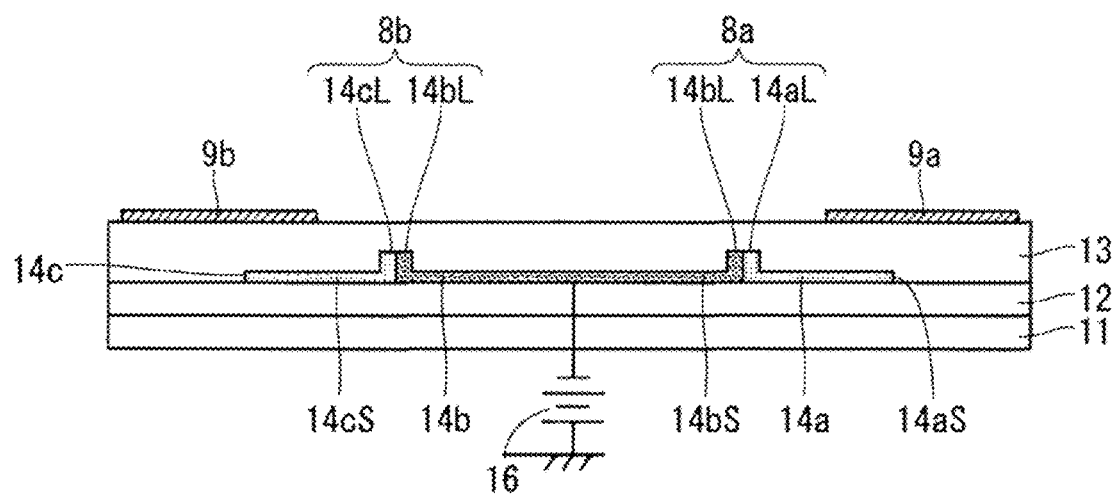
FIG. 8 is a cross section showing the configuration of the Mach-Zehnder type optical modulator in accordance with the second preferred embodiment.

As shown in FIGS. 7 and 8, the first semiconductor region 14a includes a slab 14aS and a rib 14aL, the second semiconductor region 14b includes a slab 14bS and two ribs 14bL, and the third semiconductor region 14c includes a slab 14cS and a rib 14cL.

An adjacent portion between the first semiconductor region 14a and the second semiconductor region 14b corresponds to the first optical waveguide 8a. Further, in a case where the adjacent portion is formed of the rib 14aL and the rib 14bL, the first optical waveguide 8a may be the adjacent portion itself, may be part of the adjacent portion, or may be a portion formed of the slab and a clad additionally to the adjacent portion. Similarly, an adjacent portion between the second semiconductor region 14b and the third semiconductor region 14c corresponds to the second optical waveguide 8b. Further, in a case where the adjacent portion is formed of another rib 14bL and the rib 14cL, the second optical waveguide 8b may be the adjacent portion itself, may be part of the adjacent portion, or may be a portion formed of the slab and a clad additionally to the adjacent portion. A clad layer including the lower clad layer 12 and the upper clad layer 13 described above covers the first to third semiconductor regions 14a to 14c of the core layer 14, to thereby cover the first and second optical waveguides 8a and 8b. Furthermore, the refractive index of the lower clad layer 12 and the upper clad layer 13 is lower than that of the first and second optical waveguides 8a and 8b.

In the second preferred embodiment, the rib 14aL and the rib 14bL are connected to each other, to thereby form a PN junction, and another rib 14bL and the rib 14cL are connected to each other, to thereby form a PN junction. For this reason, the first optical waveguide 8a which corresponds to the adjacent portion between the first semiconductor region 14a and the second semiconductor region 14b includes a p-type semiconductor and an n-type semiconductor, and the second optical waveguide 8b which corresponds to the adjacent portion between the second semiconductor region 14b and the third semiconductor region 14c includes a p-type semiconductor and an n-type semiconductor.

When a reverse bias is applied to the PN junction by using the DC power supply 16, a depletion layer is formed in the PN junction, and therefore carriers can move at a high speed and further the modulation rate of light can be increased.

Further, when a voltage is applied to the PN junction, change in carrier density is caused and carrier plasma dispersion is caused, and therefore the refractive index is changed. When the carrier density increases, the refractive index decreases, and when the carrier density decreases, the refractive index increases. When the high-frequency signal is applied to the first and second travelling wave electrodes 9a and 9b, for example, the width of the depletion layer is reduced in the PN junction made of the rib 14aL and the rib 14bL, and therefore the carrier density of the first optical waveguide 8a decreases and the refractive index increases. Since the width of the depletion layer is increased in the PN junction made of the rib 14bL and the rib 14cL, however, the carrier density of the second optical waveguide 8b increases and the refractive index decreases. With such a phenomenon, by controlling the carrier density of the PN junction, the refractive index of the first optical waveguide 8a is changed, and further the phase of the optical signal propagating in the first optical waveguide 8a is modulated. Furthermore, in the second preferred embodiment, since the PN junction of the rib 14aL and the rib 14bL and the PN junction of the rib 14bL and the rib 14cL are connected in series oppositely, the capacity of the PN junction can be reduced and further the band can be increased.

Thus, one exemplary configuration of the clad layer and the optical waveguide has been described. Various configurations described in the first preferred embodiment, however, can be applied also to the second preferred embodiment.

As shown in FIGS. 6 and 7, a plurality of first via holes 10a which are a plurality of through holes connecting the first travelling wave electrode 9a and the first semiconductor region 14a are provided in the clad layer on the first semiconductor region 14a except the first optical waveguide 8a, along the first optical waveguide 8a. Similarly, a plurality of second via holes 10b which are a plurality of through holes connecting the second travelling wave electrode 9b and the third semiconductor region 14c are provided in the clad layer on the third semiconductor region 14c except the second optical waveguide 8b, along the second optical waveguide 8b.

In the second preferred embodiment, the plurality of first via holes 10a are provided periodically (at regular distance intervals) in the upper clad layer 13 on the first semiconductor region 14a except the rib, along the first optical waveguide 8a and further the first travelling wave electrode 9a. Similarly, the plurality of second via holes 10b are provided periodically (at regular distance intervals) in the upper clad layer 13 on the third semiconductor region 14c except the rib, along the second optical waveguide 8b and further the second travelling wave electrode 9b. With the arrangement of the plurality of first and second via holes 10a and 10b, it is possible to simplify the structural design and the fabrication process.

Further, in the second preferred embodiment, each of the plurality of first via holes 10a has a shape extending in an extension direction of the first travelling wave electrode 9a in a plan view. Similarly, each of the plurality of second via holes 10b has a shape extending in an extension direction of the second travelling wave electrode 9b in a plan view. With such a shape of each of the plurality of first and second via holes 10a and 10b, it is possible to simplify the structural design and the fabrication process.

The first travelling wave electrode 9a is provided immediately on the plurality of first via holes 10a in a cross section and connected to the first semiconductor region 14a through the plurality of first via holes 10a. Similarly, the second travelling wave electrode 9b is provided immediately on the plurality of second via holes 10b in a cross section and connected to the third semiconductor region 14c through the plurality of second via holes 10b. Specifically, the first travelling wave electrode 9a is electrically connected to the first semiconductor region 14a through a not-shown conductive member inside each of the plurality of first via holes 10a, and the second travelling wave electrode 9b is electrically connected to the third semiconductor region 14c through a not-shown conductive member inside each of the plurality of second via holes 10b. With the first and second travelling wave electrodes 9a and 9b, a voltage to modulate the optical signal propagating in the first and second optical waveguides 8a and 8b can be applied to the first and second optical waveguides 8a and 8b.

The first travelling wave electrode 9a extends along the first optical waveguide 8a to have a width and a length in a plan view and the width is larger than that of each of the plurality of first via holes 10a. Similarly, the second travelling wave electrode 9b extends along the second optical waveguide 8b to have a width and a length in a plan view and the width is larger than that of each of the plurality of second via holes 10b.

The first and second travelling wave electrodes 9a and 9b each have no T-shaped electrode shown in Patent Document 1 and Non-Patent Document 1. The shape of each of the first and second travelling wave electrodes 9a and 9b in a plan view includes, for example, a solid shape or the like, like in the first preferred embodiment. Further, in the second preferred embodiment, the shapes of the first and second travelling wave electrodes 9a and 9b are line symmetric to each other with respect to a center line between the first and second optical waveguides 8a and 8b, and the width of the first travelling wave electrode 9a and that of the second travelling wave electrode 9b are equal to each other. With such line symmetric shapes of the first and second travelling wave electrodes 9a and 9b, it is possible to make the structural design easier.

Thus, one exemplary configuration of the first and second via holes 10a and 10b and the first and second travelling wave electrodes 9a and 9b has been described. Various configurations described in the first preferred embodiment, however, can be applied also to the second preferred embodiment.

Next, the structural design of the optical modulator 1 in accordance with the second preferred embodiment will be described. Also in the optical modulator 1 of the second preferred embodiment, like in the first preferred embodiment, in order to perform the impedance matching and the refractive index matching, the capacitance and the inductance of the modulator are optimized. The optimization goal is, for example, to make the impedance $Z_0$ approximate to 50Ω and make the high-frequency refractive index $n_\mu$ approximate to a value of the optical refractive index $n_{opt}$, i.e., 3.7, and in other words, in Eqs. (1) and (2), to make the inductance $L_0$ approximate to 617 nH/m and make the capacitance $C_0$ approximate to 246 pH/m. Further, since specific Equations and procedures of the structural design of the second preferred embodiment are almost the same as those of the first preferred embodiment, description thereof will be omitted herein.

FIGS. 9 to 12 are graphs showing a calculation result (thick line) obtained in the design of the optical modulator 1 of the second preferred embodiment, a calculation result (thin line) obtained in the design of the optical modulator of Non-Patent Document 1, and a target value (broken line).

Figure 9:
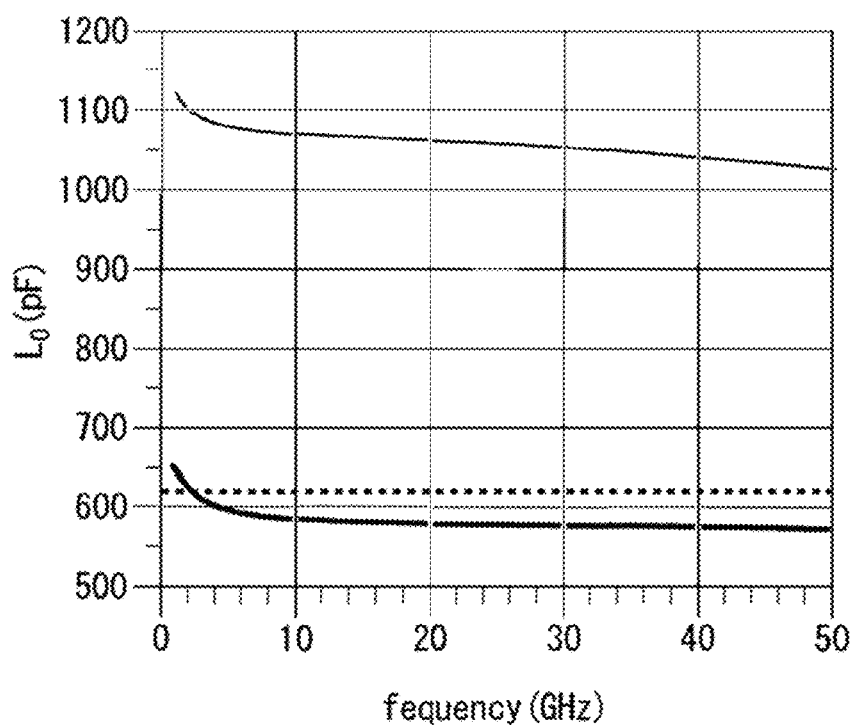
FIG. 9 is a graph for comparison between the Mach-Zehnder type optical modulator in accordance with the second preferred embodiment and a Mach-Zehnder type optical modulator of Non-Patent Document 1.

As shown in FIG. 9, the inductance $L_0$ of the optical modulator 1 of the second preferred embodiment is reduced, as compared with that of the optical modulator of Non-Patent Document 1. The reason is estimated that the electrode distance in the optical modulator 1 of the second preferred embodiment can be made shorter than that in the optical modulator of Non-Patent Document 1 since the optical modulator 1 has no T-shaped electrode.

Figure 10:
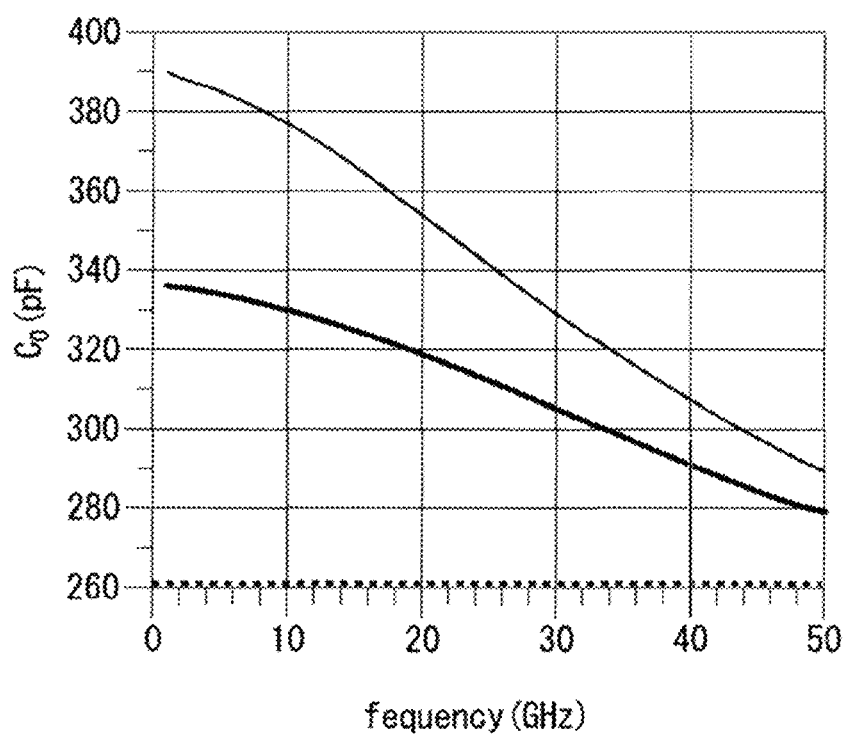
FIG. 10 is a graph for comparison between the Mach-Zehnder type optical modulator in accordance with the second preferred embodiment and the Mach-Zehnder type optical modulator of Non-Patent Document 1.

As shown in FIG. 10, the capacitance $C_0$ of the optical modulator 1 of the second preferred embodiment is reduced, as compared with that of the optical modulator of Non-Patent Document 1. The reason is estimated that the capacitance caused by the T-shaped electrode is removed in the optical modulator 1 of the second preferred embodiment.

Figure 11:
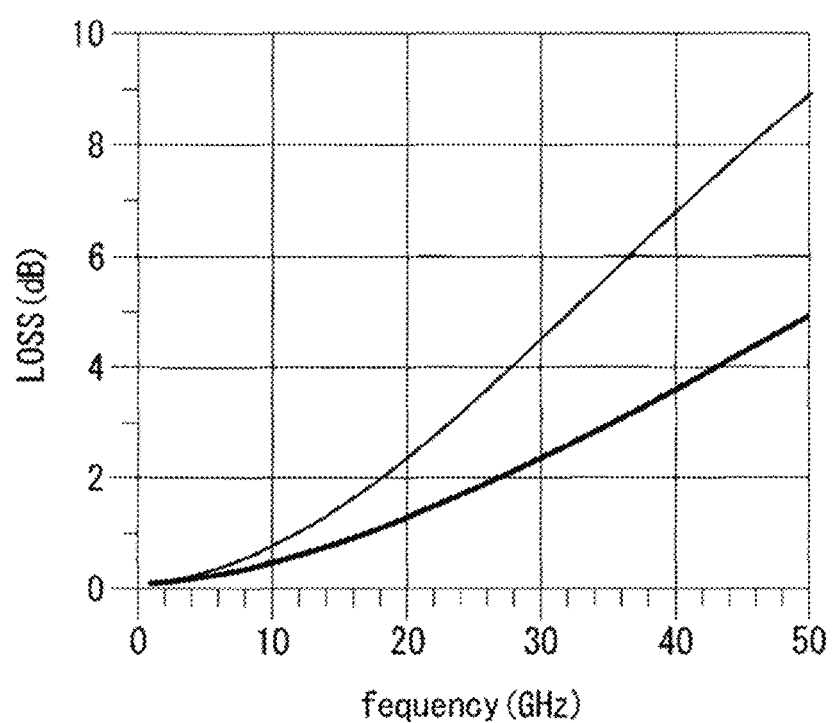
FIG. 11 is a graph for comparison between the Mach-Zehnder type optical modulator in accordance with the second preferred embodiment and the Mach-Zehnder type optical modulator of Non-Patent Document 1.

As shown in FIG. 11, the loss in the signal intensity of the optical modulator 1 of the second preferred embodiment is reduced, as compared with that of the optical modulator of Non-Patent Document 1. The reason is estimated that the inductance $L_0$ of the modulator and the capacitance $C_0$ of the modulator can be reduced in the optical modulator 1 of the second preferred embodiment.

As shown in FIG. 12, reduction in the electro-optical conversion gain EO in the high frequency (for example, −3 dB band) is suppressed in the optical modulator 1 of the second preferred embodiment, as compared with that of the optical modulator of Non-Patent Document 1. The reason is estimated that the impedance $Z_0$ and the high-frequency refractive index $n_\mu$ can be made approximate to the respective target values, 50Ω and 3.7, in the optical modulator 1 of the second preferred embodiment.

<Summary of the Second Preferred Embodiment>

In the Mach-Zehnder type optical modulator 1 of the second preferred embodiment described above, the plurality of first and second via holes 10a and 10b are provided in the clad layer, and the first and second travelling wave electrodes 9a and 9b are connected to the first and third semiconductor regions 14a and 14c through the plurality of first and second via holes 10a and 10b. With such a configuration, like in the first preferred embodiment, by adjusting the plurality of first and second via holes 10a and 10b, it is possible to perform matching of the inductance and the capacitance of the modulator. Further, since the travelling wave electrode has no T-shaped electrode, it is possible to reduce the size of the Mach-Zehnder type optical modulator. Furthermore, since the inductance decreases, it becomes easier to perform matching. Moreover, since the cost of the Mach-Zehnder type optical modulator including the group IV semiconductor is generally lower than that of the Mach-Zehnder type optical modulator including the group III-V semiconductor and an insulator in which the via holes can be formed is found, simplification of the device fabrication process and cost reduction can be expected.

Further, in the second preferred embodiment, since the first optical waveguide 8a which corresponds to the adjacent portion and the second optical waveguide 8b which corresponds to the adjacent portion each include the p-type semiconductor and the n-type semiconductor, it is possible to make the structural design easier.

Further, when the Mach-Zehnder type optical modulator of the second preferred embodiment is applied to a Mach-Zehnder type optical modulator of the phase modulation system, it is possible to perform multi-level modulation and increase the amount of information to be transmitted. Furthermore, when the Mach-Zehnder type optical modulator of the second preferred embodiment is applied to a Mach-Zehnder type optical modulator of the intensity modulation system, this is effective for long-distance use since the wavelength chirping can be reduced.

The Third Preferred Embodiment

Figure 13:
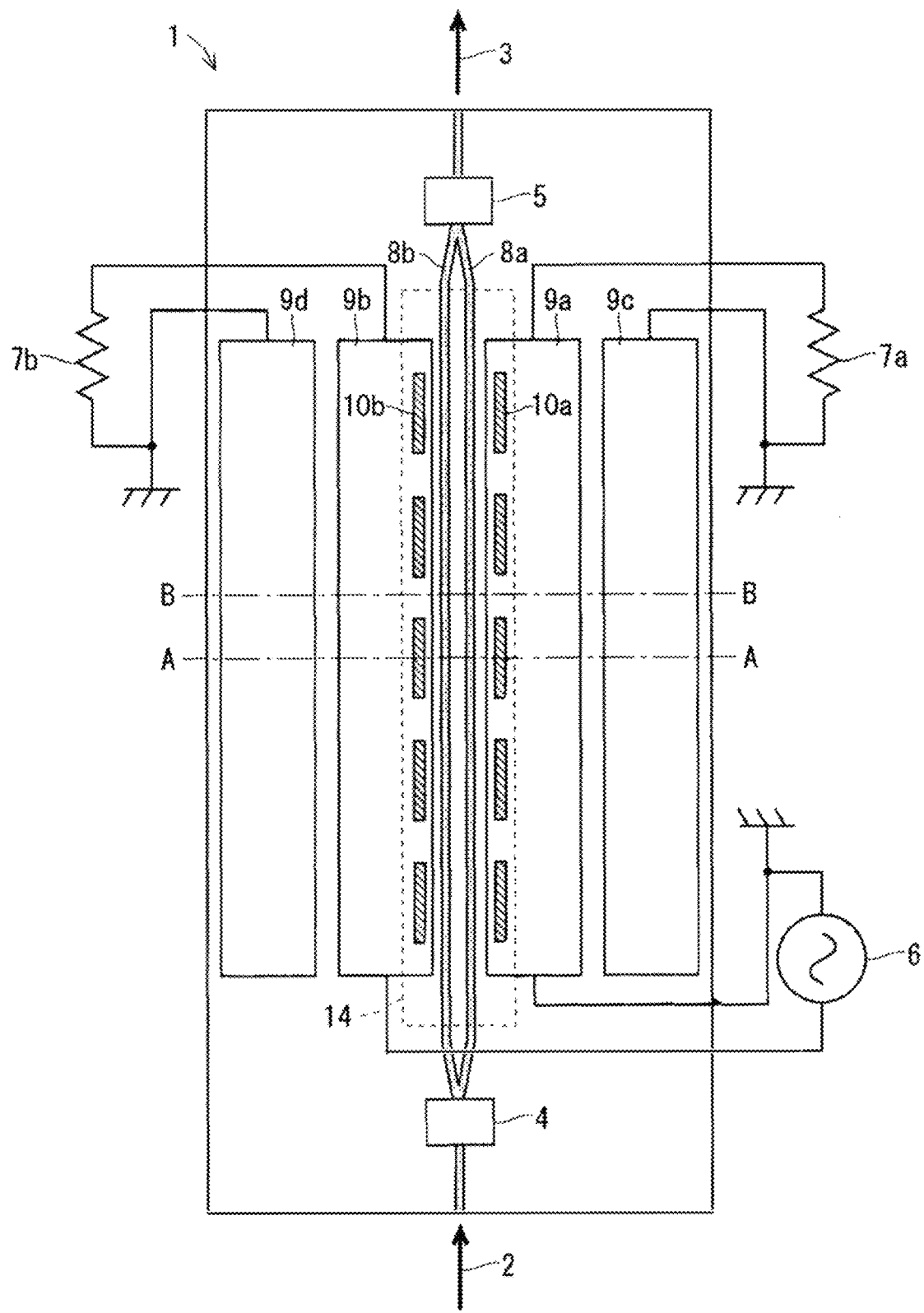
FIG. 13 is a plan view showing a configuration of a Mach-Zehnder type optical modulator in accordance with a third preferred embodiment.
Figure 14:
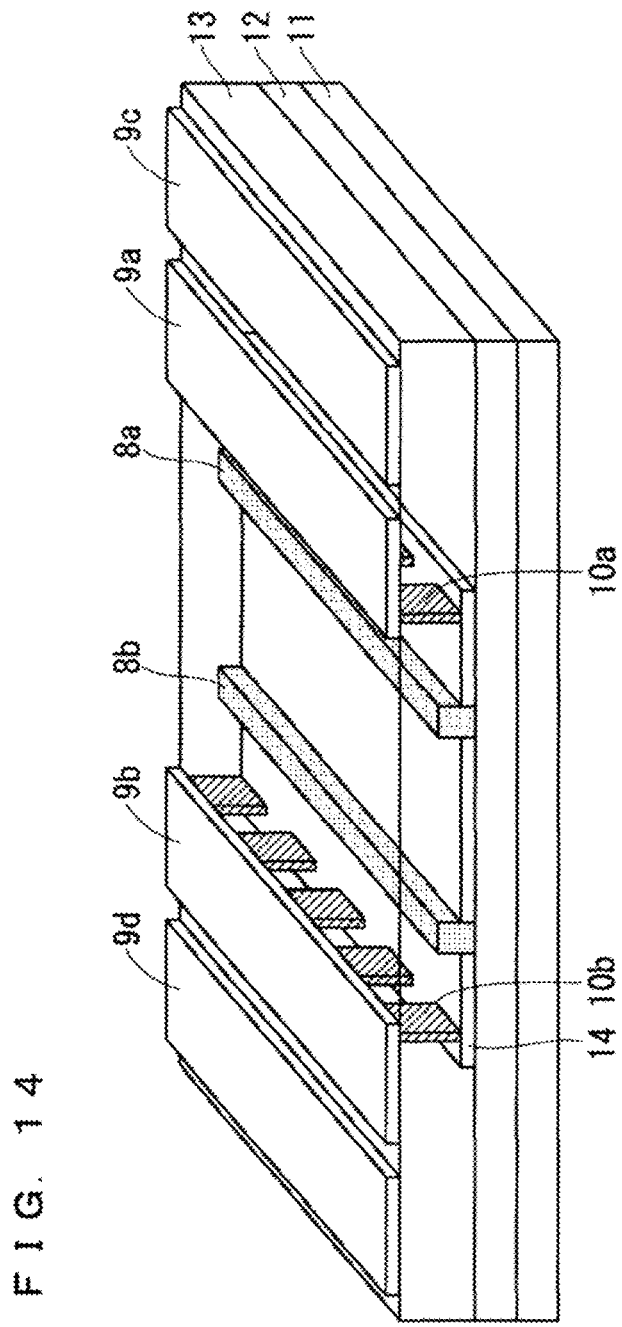
FIG. 14 is a perspective view showing the configuration of the Mach-Zehnder type optical modulator in accordance with the third preferred embodiment.

FIG. 13 is a plan view showing a configuration of a Mach-Zehnder type optical modulator 1 (hereinafter, sometimes abbreviated to an "optical modulator 1") in accordance with the third preferred embodiment of the present invention. FIG. 14 is a perspective view showing the configuration of the optical modulator 1 in accordance with the third preferred embodiment. FIG. 15 is a cross section taken along the line A-A of FIG. 13, and FIG. 16 is a cross section taken along the line B-B of FIG. 13. Hereinafter, the constituent elements of the third preferred embodiment which are identical to or similar to those described above will be represented by the same reference signs, and different constituent elements will be mainly described.

The optical modulator 1 of the third preferred embodiment includes a third travelling wave electrode 9c and a fourth travelling wave electrode 9d, besides the optical modulator (FIG. 5) of the second preferred embodiment, and includes first and second terminating resistors 7a and 7b instead of the terminating resistor 7 of the second preferred embodiment.

The third travelling wave electrode 9c is provided on the clad layer opposite to the first optical waveguide 8a with respect to the first travelling wave electrode 9a in a plan view and connected to the first travelling wave electrode 9a through the first terminating resistor 7a. The fourth travelling wave electrode 9d is provided on the clad layer opposite to the second optical waveguide 8b with respect to the second travelling wave electrode 9b in a plan view and connected to the second travelling wave electrode 9b through the second terminating resistor 7b.

An electrical signal outputted from the signal source 6 is inputted to the first and second travelling wave electrodes 9a and 9b provided along a portion extending in one direction of the first optical waveguide 8a. The first and second travelling wave electrodes 9a and 9b are signal electrodes for applying a pair of differential signals, and the third and fourth travelling wave electrodes 9c and 9d are ground electrodes.

In the third preferred embodiment having such a configuration, for performing differential drive, the resistance values of the first and second terminating resistors 7a and 7b are each preferably, for example, 100Ω but may take any other value. Further, since the optical modulator 1 of the third preferred embodiment performs the differential drive, it is possible to reduce the power consumption of the optical modulator 1 of the third preferred embodiment to half of the power consumption of the optical modulator 1 of the second preferred embodiment which performs the single-phase drive. Furthermore, in the third preferred embodiment, though the shapes of the first and third travelling wave electrodes 9a and 9c and those of the second and fourth travelling wave electrodes 9b and 9d are line symmetric to each other with respect to a virtual center line between the first and second optical waveguides 8a and 8b for simplification of the structural design, these line symmetric shapes are not essential. Further, since the constituent elements other than those described above in the third preferred embodiment are almost the same as those of the first and second preferred embodiments, description thereof will be omitted herein.

Next, the structural design of the optical modulator 1 in accordance with the third preferred embodiment will be described. Also in the optical modulator 1 of the third preferred embodiment, like in the first and second preferred embodiments, in order to perform the impedance matching and the refractive index matching, the capacitance and the inductance of the modulator are optimized. In the third preferred embodiment, however, the optimization goal is, for example, to make the impedance $Z_0$ approximate to 100Ω and make the high-frequency refractive index $n_\mu$ approximate to a value of the optical refractive index $n_{opt}$, i.e., 3.7. Further, since specific Equations and procedures of the structural design of the third preferred embodiment are almost the same as those of the first and second preferred embodiments, description thereof will be omitted herein.

<Summary of the Third Preferred Embodiment>

The Mach-Zehnder type optical modulator 1 of the third preferred embodiment described above can produce the same effect as that in the second preferred embodiment. Further, since the optical modulator 1 of the third preferred embodiment includes the third and fourth travelling wave electrodes 9c and 9d, the differential drive can be performed, and as a result of this, it is possible to reduce the power consumption.

Further, in the present invention, the preferred embodiments may be freely combined, or may be changed or omitted as appropriate, without departing from the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

1 Mach-Zehnder type optical modulator, 4 demultiplexer, 5 multiplexer, 7a first terminating resistor, 7b second terminating resistor, 8a first optical waveguide, 8b second optical waveguide, 9a first travelling wave electrode, 9b second travelling wave electrode, 9c third travelling wave electrode, 9d fourth travelling wave electrode, 10a first via hole, 10b second via hole, 12 lower clad layer, 13 upper clad layer, 14*a* first semiconductor region, 14*b* second semiconductor region, 14*c* third semiconductor region

The invention claimed is:
1. A Mach-Zehnder type optical modulator, comprising:
a first semiconductor region;
a second semiconductor region provided adjacent to the first semiconductor region; and
a clad layer which covers an optical waveguide corresponding to an adjacent portion between the first semiconductor region and the second semiconductor region by covering the first semiconductor region and the second semiconductor region and has a refractive index lower than that of the optical waveguide,
wherein a plurality of first via holes are provided in the clad layer on the first semiconductor region along a longest dimension of the optical waveguide in a plan view such that the plurality of first via holes do not overlap the optical waveguide in the plan view, and each of the plurality of first via holes has a shape extending farther in the longest dimension of the optical waveguide than in a direction perpendicular to the longest dimension of the optical waveguide, and
a plurality of second via holes are provided in the clad layer on the second semiconductor region along the longest dimension of the optical waveguide in the plan view such that the plurality of second via holes do not overlap the optical waveguide in the plan view, and each of the plurality of second via holes has a shape extending farther in the longest dimension of the optical waveguide than in a direction perpendicular to the longest dimension of the optical waveguide,
the Mach-Zehnder type optical modulator further comprising:
a first travelling wave electrode provided on the plurality of first via holes in a cross section and connected to the first semiconductor region through the plurality of first via holes, the first travelling wave electrode extending along the longest dimension of the optical waveguide in the plan view and having a width wider than that of each of the plurality of first via holes; and
a second travelling wave electrode provided on the plurality of second via holes in the cross section and connected to the second semiconductor region through the plurality of second via holes, the second travelling wave electrode extending along the longest dimension of the optical waveguide in the plan view and having a width wider than that of each of the plurality of second via holes.

2. The Mach-Zehnder type optical modulator according to claim 1, wherein
the plurality of first via holes are provided periodically along the first travelling wave electrode, and
the plurality of second via holes are provided periodically along the second travelling wave electrode.

3. The Mach-Zehnder type optical modulator according to claim 1, wherein
each of the plurality of first via holes has a shape extending in an extension direction of the first travelling wave electrode in the plan view, and
each of the plurality of second via holes has a shape extending in an extension direction of the second travelling wave electrode in the plan view.

4. The Mach-Zehnder type optical modulator according to claim 1, wherein the width of the first travelling wave electrode and that of the second travelling wave electrode are equal to each other.

5. The Mach-Zehnder type optical modulator according to claim 1, wherein
the adjacent portion includes a p-type semiconductor and an n-type semiconductor.

6. The Mach-Zehnder type optical modulator according to claim 1, wherein
the refractive index of the optical waveguide can be changed by applying a voltage to the optical waveguide through the first travelling wave electrode and the second travelling wave electrode,
the Mach-Zehnder type optical modulator further comprising:
a demultiplexer connected to a light input portion of the optical waveguide and a light input portion of another optical waveguide; and
a multiplexer for synthesizing light outputted from a light output portion of the optical waveguide and light outputted from a light output portion of the another optical waveguide.

7. The Mach-Zehnder type optical modulator according to claim 6, wherein
at least one of the phase and the intensity of light inputted to the Mach-Zehnder type optical modulator can be modulated.

8. The Mach-Zehnder type optical modulator according to claim 1, wherein
the plurality of first via holes are provided aperiodically along the first travelling wave electrode, and
the plurality of second via holes are provided aperiodically along the second travelling wave electrode.

9. The Mach-Zehnder type optical modulator according to claim 1, wherein
each of the plurality of first via holes is separated from an adjacent one of the plurality of first via holes along the longest dimension of the optical waveguide in the plan view by a first separation length that is smaller than a length of the shape of each of the plurality of first via holes along the longest dimension of the optical waveguide in the plan view, and
each of the plurality of second via holes is separated from an adjacent one of the plurality of second via holes along the longest dimension of the optical waveguide in the plan view by a second separation length that is smaller than a length of the shape of each of the plurality of second via holes along the longest dimension of the optical waveguide in the plan view.

10. A Mach-Zehnder type optical modulator, comprising:
a first semiconductor region;
a second semiconductor region provided adjacent to the first semiconductor region;
a third semiconductor region provided adjacent to the second semiconductor region on the opposite side of the first semiconductor region; and
a clad layer which covers a first optical waveguide corresponding to an adjacent portion between the first semiconductor region and the second semiconductor region by covering the first semiconductor region and the second semiconductor region, covers a second optical waveguide corresponding to an adjacent portion between the second semiconductor region and the third semiconductor region by covering the second semiconductor region and the third semiconductor region, and has a refractive index lower than those of the first optical waveguide and the second optical waveguide, wherein a plurality of first via holes are provided in the clad layer on the first semiconductor region along a longest dimension of the first optical waveguide in a plan view such that the plurality of first via holes do not overlap the first optical waveguide in the plan view, and each of the plurality of first via holes has a shape extending farther in the longest dimension of the first optical waveguide than in a direction perpendicular to the longest dimension of the first optical waveguide, and a plurality of second via holes are provided in the clad layer on the second semiconductor region along a longest dimension of the second optical waveguide in the plan view such that the plurality of second via holes do not overlap the second optical waveguide in the plan view, and each of the plurality of second via holes has a shape extending farther in the longest dimension of the second optical waveguide than in a direction perpendicular to the longest dimension of the second optical waveguide, the Mach-Zehnder type optical modulator further comprising:

a first travelling wave electrode provided on the plurality of first via holes in a cross section and connected to the first semiconductor region through the plurality of first via holes, the first travelling wave electrode extending along the longest dimension of the first optical waveguide in the plan view and having a width wider in the plan view than that of each of the plurality of first via holes; and a second travelling wave electrode provided on the plurality of second via holes in the cross section and connected to the third semiconductor region through the plurality of second via holes, the second travelling wave electrode extending along the longest dimension of the second optical waveguide in the plan view and having a width wider in the plan view than that of each of the plurality of second via holes.

11. The Mach-Zehnder type optical modulator according to claim 10, further comprising:

a third travelling wave electrode provided on the clad layer opposite to the first optical waveguide with respect to the first travelling wave electrode in the plan view and connected to the first travelling wave electrode through a first terminating resistor; and a fourth travelling wave electrode provided on the clad layer opposite to the second optical waveguide with respect to the second travelling wave electrode in the plan view and connected to the second travelling wave electrode through a second terminating resistor.

12. The Mach-Zehnder type optical modulator according to claim 10, wherein the refractive index of one of the first optical waveguide and the second optical waveguide can be changed by applying a voltage to the first optical waveguide and the second optical waveguide through the first travelling wave electrode and the second travelling wave electrode, the Mach-Zehnder type optical modulator further comprising:

a demultiplexer connected to a light input portion of the first optical waveguide and a light input portion of the second optical waveguide; and a multiplexer for synthesizing light outputted from a light output portion of the first optical waveguide and light outputted from a light output portion of the second optical waveuuide.

13. The Mach-Zehnder type optical modulator according to claim 12, wherein at least one of the phase and the intensity of light inputted to the Mach-Zehnder type optical modulator can be modulated.

* * * * *